(12) United States Patent
Landon

(10) Patent No.: US 10,119,254 B2
(45) Date of Patent: Nov. 6, 2018

(54) TREATMENT DEVICES FOR DRAINS

(71) Applicant: Green Drain Inc., Naples, FL (US)

(72) Inventor: Frank Landon, Santa Ana, CA (US)

(73) Assignee: GREEN DRAIN, INC., Naples, FL (US)

( * ) Notice: Subject to any disclaimer, the term of this patent is extended or adjusted under 35 U.S.C. 154(b) by 0 days.

(21) Appl. No.: 15/009,118

(22) Filed: Jan. 28, 2016

(65) Prior Publication Data

US 2016/0215483 A1    Jul. 28, 2016

Related U.S. Application Data

(60) Provisional application No. 62/108,938, filed on Jan. 28, 2015.

(51) Int. Cl.

| | |
|---|---|
| *E03C 1/126* | (2006.01) |
| *A01M 1/20* | (2006.01) |
| *C11D 3/38* | (2006.01) |
| *C11D 3/00* | (2006.01) |
| *E03F 5/04* | (2006.01) |
| *C11D 3/386* | (2006.01) |
| *C11D 11/00* | (2006.01) |

(52) U.S. Cl.
CPC ............... *E03C 1/126* (2013.01); *A01M 1/20* (2013.01); *C11D 3/0068* (2013.01); *C11D 3/381* (2013.01); *C11D 3/38627* (2013.01); *C11D 3/38636* (2013.01); *C11D 11/0023* (2013.01); *E03F 5/041* (2013.01)

(58) Field of Classification Search
CPC .. E03C 1/126; A01M 1/2055; B02C 18/0092; A47K 1/14
See application file for complete search history.

(56) References Cited

U.S. PATENT DOCUMENTS

| | | | |
|---|---|---|---|
| 5,323,804 A | 6/1994 | Lin | |
| 7,618,532 B2 | 11/2009 | Worth | |
| 7,887,697 B2 | 2/2011 | Worth | |
| 7,900,288 B2 * | 3/2011 | Fima | C02F 1/325 4/287 |

(Continued)

FOREIGN PATENT DOCUMENTS

| | | |
|---|---|---|
| CN | 2579967 Y | 10/2003 |
| CN | 101922179 A | 12/2010 |

(Continued)

OTHER PUBLICATIONS

International Search Report and Written Opinion for International application No. PCT /US2016/015357 International filing date Jan. 28, 2016; Date of mailing of the international search report dated May 30, 2016.

*Primary Examiner* — Janie Loeppke
(74) *Attorney, Agent, or Firm* — Fish IP Law, LLP

(57) ABSTRACT

A treatment device for a drain is presented to reduce at least one of odor, insect, uric acid, and grease and oil problems. The treatment comprises a dispenser that is configured to couple a stem from a drain extending into a drain pipe. At least a portion of the dispenser is composed of the active agent and thereby dispenses the active agent. The active agent includes at least one of an insecticide, a deodorant, uric acid-consuming bacteria, and an enzyme that digests grease and oil. Thus, problems associated with drains are substantially reduced using the treatment device.

20 Claims, 8 Drawing Sheets

(56) References Cited

U.S. PATENT DOCUMENTS

| | | |
|---|---|---|
| D669,969 S | 10/2012 | Forrest et al. |
| 8,640,271 B2 | 2/2014 | Cadavid |
| 2007/0262006 A1* | 11/2007 | Worth ................ E03C 1/126 |
| | | 210/164 |
| 2008/0168596 A1 | 7/2008 | Findlay et al. |
| 2012/0199215 A1 | 8/2012 | Cohen |
| 2012/0266372 A1 | 10/2012 | Epstein et al. |
| 2013/0240423 A1 | 9/2013 | Epstein |
| 2014/0166560 A1 | 6/2014 | Cohen et al. |
| 2014/0201904 A1 | 7/2014 | Sapara, Jr. |
| 2015/0000183 A1 | 1/2015 | Sapara, Jr. |
| 2015/0013064 A1 | 1/2015 | Marty et al. |

FOREIGN PATENT DOCUMENTS

| | | |
|---|---|---|
| EP | 0180451 | 7/1988 |
| WO | 2010073048 | 7/2010 |

\* cited by examiner

TREATMENT DEVICES FOR DRAINS

This application claims priority to U.S. Provisional Application No. 62/108,938, filed Jan. 28, 2015. All extrinsic materials identified herein are incorporated by reference in their entirety.

FIELD OF THE INVENTION

The field of the invention is a treatment device for reducing common issues found in drains.

BACKGROUND

The background description includes information that may be useful in understanding the present invention. It is not an admission that any of the information provided herein is prior art or relevant to the presently claimed invention, or that any publication specifically or implicitly referenced is prior art.

Drains are important components in plumbing systems that provide a means for fluids to be removed from an area. For example, many facilities have floor drains that can be used to remove waste water from an area in the facility. However, drains can lead to problems if improperly maintained. Unpleasant odor from waste in the drain pipe can spread through the drain and into the facility. Moreover, insects can crawl through a drain into the facility.

Some have attempted to reduce the problems associated with drains by using one-way flow. U.S. Pat. No. 5,323,804 to Lin discloses a one-way opening draining outlet that comprises two flaps. The flaps have a counterweight so that water can be discharged through the draining outlet, and the flaps automatically close due to gravity exerted on the counterweights when water is no longer being discharged. Other have similarly contemplated one-way outlets or water traps to reduce a flow from the drain pipe through the drain in CN 2579967Y to Ke, CN 101922179A to Fu, and U.S. Pat. No. 8,640,271 to Cadavid. Although adding a one-way outlet will reduce problems associated with drains, such configurations appear to complicate the drain assembly by requiring additional components to be installed to create the one-way outlet.

Others have attempted to reduce the problems associated with drains by using treatment materials, such as deodorants and insecticides. U.S. Pat. No. 7,887,697 to Worth discloses an aromatic drain device having a retaining device that holds an aromatic media. The retaining device is secured to a threaded bolt that passes through a drain cover to hold the retaining device below the drain cover. U.S. Patent Application Publication No. 2012/0266372 to Epstein discloses a treatment assembly for a drain comprising a drain cover skirt and a basket assembly containing a treatment material. The drain cover skirt has an opening that receives the basket assembly containing the treatment material. Similarly, U.S. Patent Application Publication No. 2013/0240423 to Epstein, U.S. Patent Application Publication No. 2015/0000183, and the Drain-Net Defender contemplate the use of treatment materials to eliminate problems associated with drains. However, similar to one-way outlet, it appears that additional components are required to use the treatment material, which complicates the drain assembly.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need in the art for improved treatment devices for reducing problems associated with drains.

SUMMARY OF THE INVENTION

The inventive subject matter provides apparatus, systems, and methods in which a treatment device for a drain is used to reduce at least one of odor, insect, uric acid, and grease and oil problems in drains. The treatment device comprises a dispenser that is configured to couple a stem that extends to a drain pipe. An active agent is dispensed by the dispenser, wherein at least a portion of the dispenser is composed of the active agent. Thus, at least in some embodiments, the dispenser can directly couple the stem of the drain and deliver the active agent. It should be appreciated that directly coupling a dispenser that is at least partially composed of the active agent to the stem eliminates the need for a basket component or other housing component for the treatment device.

The dispenser can comprise a liquid soluble material. In such embodiments, the active agent comprises at least one of an insecticide, a deodorant, uric acid-consuming bacteria, and an enzyme that digests grease and oil. It is also contemplated that the dispenser comprises an aperture that is sized and dimensioned to receive the stem to couple the dispenser to the stem. Where the stem comprises a threaded portion, the aperture of the dispenser can comprise threads to fasten the dispenser onto the stem.

As stated above, the active agent can comprise at least one of an insecticide, a deodorant, uric acid-consuming bacteria, and an enzyme that digests grease and oil. In some embodiments, a portion of the dispenser is composed of the active agent. For example, if the active agent is an insecticide, then a portion of the dispenser is an insecticide. However, it is also contemplated that the dispenser can be composed of the active agent. For example, if the active agent is an insecticide, then the dispenser is an insecticide.

It is further contemplated that the treatment device can comprise a coupler having an aperture. The aperture is configured to receive the stem to couple the coupler to the stem. Additionally, the dispenser can comprise a cavity that is sized and dimensioned to receive the coupler to couple the dispenser to the coupler. It is contemplated that the coupler comprises at least one rib that extends inward to provide a friction fit between the coupler and the stem, and at least one rib that extends outward to provide a friction fit between the coupler and the dispenser.

In another aspect, a treatment device for a drain having a stem is contemplated. The treatment device comprises a dispenser that is configured to couple a bottom portion of the stem that extends to a drain pipe. The treatment device further comprises an active agent configured to be dispensed by the dispenser. In contemplated embodiments, the active agent comprises at least one of an insecticide and uric acid-consuming bacteria.

In yet another aspect, a method of treating a drain having a stem that extends to a drain pipe with a treatment device is contemplated. The method comprises placing a dispenser that is at least partially composed of an active agent onto the stem. The active agent is configured to be dispensed by the dispenser, and comprises at least one of an insecticide, a deodorant, uric acid-consuming bacteria, and an enzyme that digests grease and oil. Thus, at least one of odor, insect, uric acid, and grease and oil problems is reduced in the drain by treating the drain using the method disclosed herein.

It should be appreciated that the dispenser can be placed on the stem in a number of ways. For example, it is contemplated that placing the dispenser onto the stem further comprises fastening a threaded aperture of the dispenser onto a threaded portion of the stem. In another example, is it contemplated that placing the dispenser onto the stem further comprises placing a coupler onto the stem and subsequently placing the dispenser onto the coupler to thereby couple the dispenser onto the stem. In another example, it is contemplated that placing the dispenser onto the stem further comprises sliding the dispenser onto the stem using an aperture on the dispenser that is configured to receive the stem.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems and methods in which a treatment device for a drain (e.g., floor drain, sink drain, etc.) is effective to reduce at least one of odor, insect, uric acid, grease and oil problems in drains. The treatment device comprises a dispenser that couples a stem of a drain, and an active agent that is typically at least one of an insecticide, a deodorant, uric acid-consuming bacteria, and an enzyme that digests grease and oil. A portion of the dispenser is preferably composed of the active agent and thereby dispenses the active agent. Thus, many of the problems associated with drains are substantially reduced.

One should appreciate that the disclosed subject matter provides many advantageous technical effects including reducing at least one of odor, insect, uric acid, grease and oil problems in drains without the need to modify the drain (e.g., to provide a one-way mechanism, to provide a basket for a treatment material, etc.). This treatment device facilitates the reduction of such problems by coupling the dispenser that is at least partially composed of an active agent onto a stem of a drain and thereby dispenses the active agent. The coupling can be direct or indirect, via a coupler, to eliminate the need for a basket or other housing and the need to modify the drain to fit a special design (e.g., one-way mechanism).

Figure 1A:
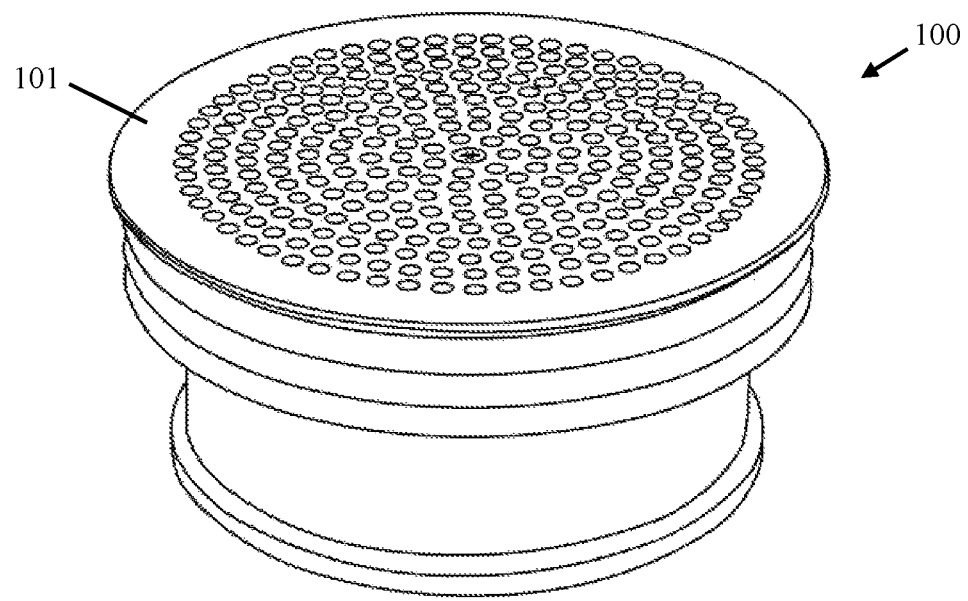
FIGS. 1A-1C are a top perspective view, a bottom perspective view, and a cross-sectional view of an embodiment of a drain having a treatment device.

FIG. 1A shows top perspective view of an embodiment of a drain 100. Drain 100 has a grate 101 that prevents solid items from falling into drain 100. It is contemplated that drain 100 can be any number of conventional floor drain models or sink drain models. However, in other embodiments, drain 100 can be a one-way valve drain, such as a drain having a skirt valve (e.g., a Green Drain™ floor drain).

Figure 1B:
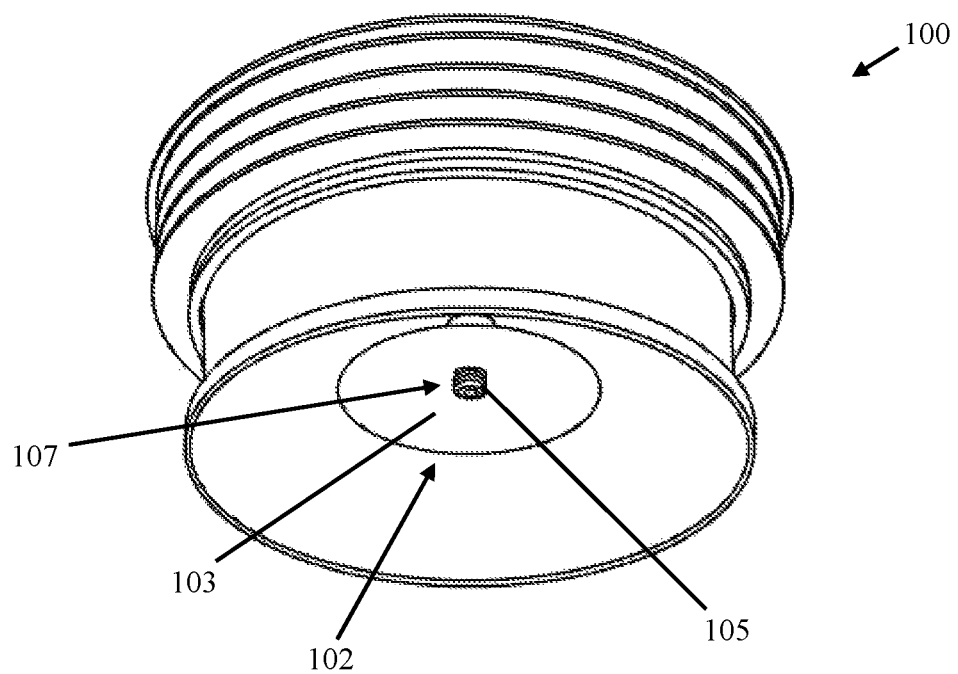
Figure 1C:
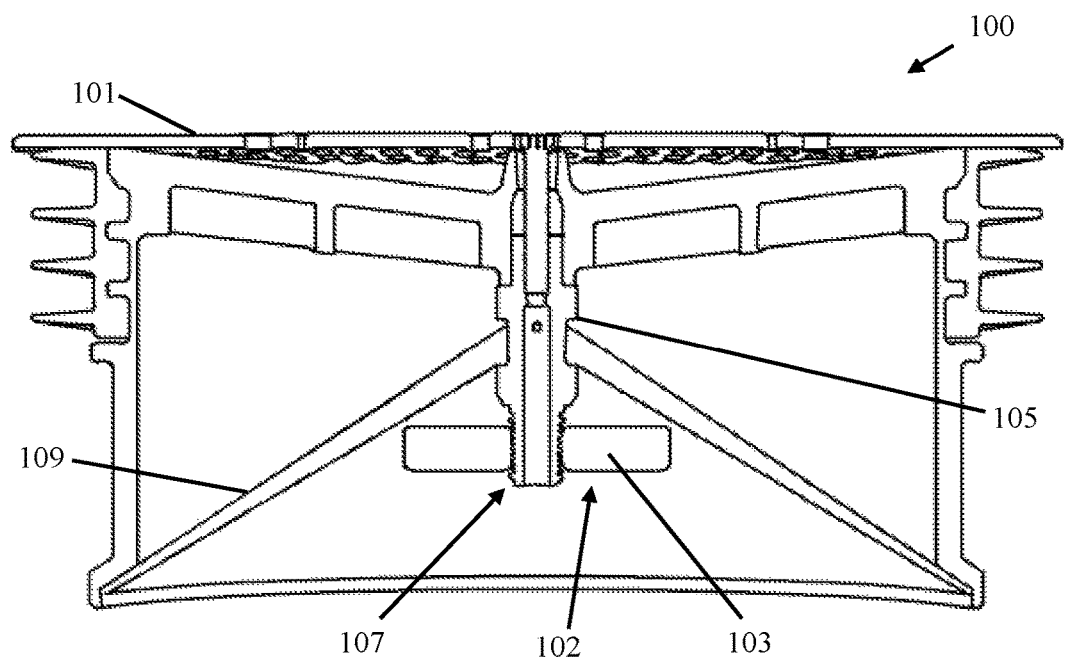

FIG. 1B shows a bottom perspective view of drain 100 having a stem 105 that extends to a drain pipe and a treatment device 102. Treatment device 102 comprises a dispenser 103 that is coupled to stem 105. Most typically, dispenser 103 couples a bottom portion 107 of stem 105. Thus, dispenser 103 is disposed below grate 101 and in the drain pipe to reduce the risk of users accidently consuming or tampering with dispenser 103 as shown in FIG. 1C.

Treatment device 102 further comprises an active agent that is configured to be dispensed by dispenser 103. It is contemplated that at least a portion of dispenser 103 is composed of the active agent to reduce at least one of odor, insect, uric acid, and grease and oil problems. For example, dispenser 103 can comprise a threaded aperture having a durable material than an area adjacent to the threaded aperture having the active agent. In such example, threaded aperture is a durable material to maintain the coupling with stem 105 and the area adjacent to the threaded hole is the portion composed of the active agent used to treat problems associated with drain 100. It is also contemplated that dispenser 103 is composed of the active agent (i.e., dispenser 103 is made of the active agent). For example, dispenser has a uniform composition of the active agent to reduce at least one of odor, insect, uric acid, and grease and oil problems.

The active agent can comprise at least one of an insecticide, a deodorant, uric acid-consuming bacteria, and an enzyme that digests grease and oil. It should be appreciated that the active agent is disposed in dispenser 103 in an amount effective to reduce at least one of odor, insect, uric acid, and grease and oil problems. In some embodiments, the active agent is an insecticide and at least a portion of dispenser 103 comprises the insecticide. In such embodiments, dispenser 103 can be a sacrificial bait that is used to kill insects. In other embodiments, the active agent is a deodorant and at least a portion of dispenser 103 comprises the deodorant. In such embodiment, dispenser 103 can be an aromatic material to reduce odor in the drain pipe. Furthermore, in other embodiments, the active agent is uric acid-consuming bacteria and at least a portion of dispenser 103 comprises uric acid-consuming bacteria.

It is contemplated that dispenser 103 can be a liquid soluble material that dissolves to dispense the active agent. Thus, the active agent comprising at least one of an insecticide, a deodorant, uric acid-consuming bacteria, and an enzyme that digests grease and oil is dispensed as dispenser 103 dissolves. It is further contemplated that dispenser 103 can be a membrane permeable bag storing the active agent.

As shown in FIG. 1C, drain comprises a skirt valve 109 disposed about stem 105. Dispenser 103 is disposed below skirt valve 109 at a bottom portion 107 of stem 105. Dispenser 103 comprises an aperture that is sized and dimensioned to receive stem 105 to couple dispenser 103 to stem 105. The aperture comprises threads that are configured to engage with a threaded portion on bottom portion 107 of stem 105. However, in other embodiments, dispenser 103 can comprise an aperture that is sized and dimensioned to slidably engage bottom portion 107 of stem 105 and couple dispenser 103 to stem 105 by a friction fit. Although the aperture of dispenser in FIGS. 1B-1C is a through hole, it is contemplated that the aperture can be a cavity that is sized and dimensioned to receive a portion of stem 105 to couple dispenser 103 to stem 105. It should be appreciated that dispenser 103 can also couple a threaded bolt or other nut on a drain assembly to be suspended below grate 101 of drain 100.

Figure 2A:
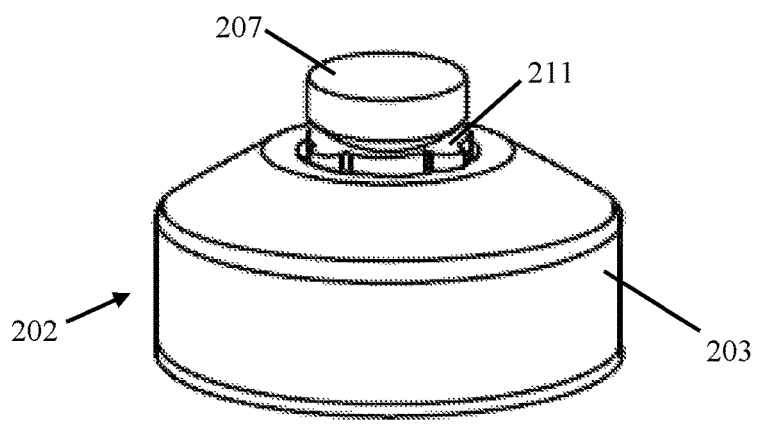
FIGS. 2A-2B are a perspective view and an exploded view of another embodiment of a treatment device.

FIG. 2A shows a treatment device 202 for a drain having a stem that extends to a drain pipe. Treatment device 202 comprises a dispenser 203 and an active agent configured to be dispensed by the dispenser. As shown in FIG. 2A, dispenser 203 is coupled to a bottom portion 207 of a stem. In typical embodiments, at least a portion of dispenser 203 is composed of the active agent.

Figure 2B:
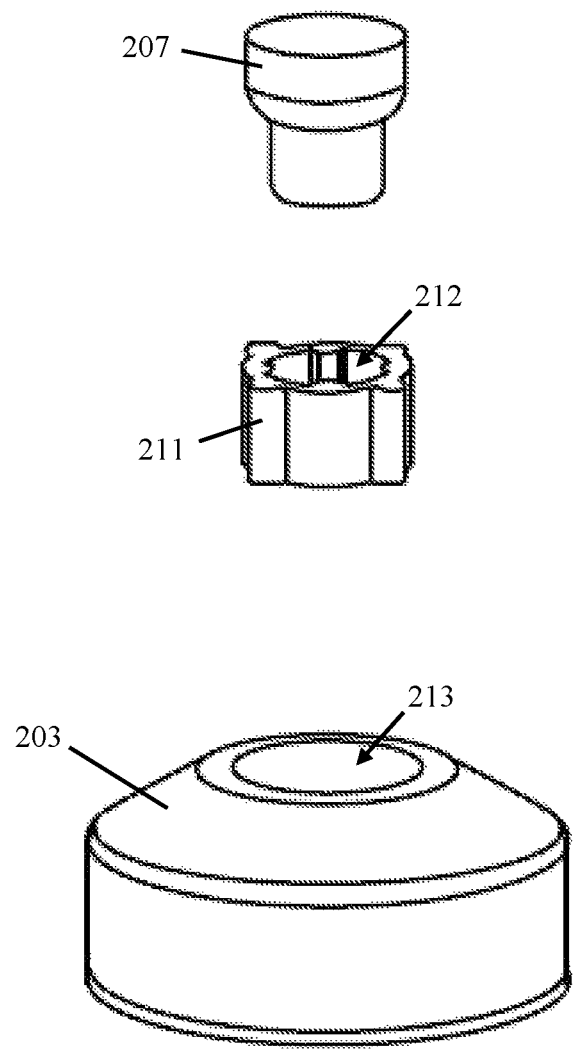

Unlike the embodiment in FIGS. 1A-1C, treatment device 202 further comprises a coupler 211, which can be more clearly seen in FIG. 2B. Coupler 211 has an aperture 212 that is configured to receive bottom portion 207 of the stem to couple coupler 211 to the stem. Furthermore, dispenser 203 further comprises a cavity 213 that is sized and dimensioned to receive coupler 211 to couple dispenser 203 to coupler 211. Thus, coupler 211 can slidably couple with bottom portion 207 of the stem and dispenser 203 can subsequently be slidably coupled to coupler 211 to indirectly couple dispenser 203 to bottom portion 207 of the stem.

In other embodiments, it is contemplated that bottom portion 207 of the stem comprises a threaded portion, such as that shown in FIGS. 1B-1C. In such embodiment, aperture 212 of coupler 211 can be threaded to engage with the treaded portion of the stem. Similarly, it is contemplated that cavity 213 of dispenser and outer surface of coupler 211 are threaded, such that dispenser 203 is fastened onto coupler 211. It should be appreciated that dispenser 203 can also couple a threaded bolt or other nut on a drain assembly to be suspended below a grate of drain.

Figure 3A:
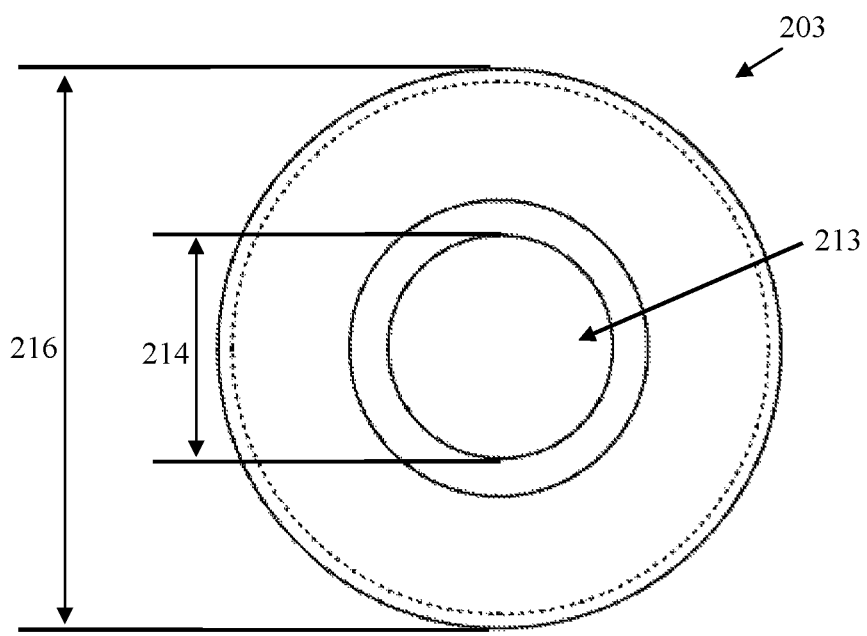
FIGS. 3A-3B are a top view and a side view of the dispenser of FIGS. 2A-2B.

FIG. 3A shows a top view and side view of dispenser 203 having a cavity 213. Cavity 213 is disposed about the center of dispenser 203 when viewed from a top view as shown in FIG. 3A. However, it is contemplated that cavity 213 can disposed about a different point that is off center from dispenser 203 when viewed from a top view. It is contemplated that the cavity 213 has a cavity diameter 214 having a length at least 25% of a dispenser diameter 216 of dispenser 203. Most typically, cavity diameter 214 has a length that is between 30-60% of dispenser diameter 216. It is contemplated that dispenser diameter 216 is between 0.5-4 inches, and more preferably, between 1 and 2.5 inches. Additionally, dispenser 203 can have a dispenser height 218 between 0.25 inches and 3 inches, and more preferably, between 0.5 inches and 2 inches.

Figure 3B:
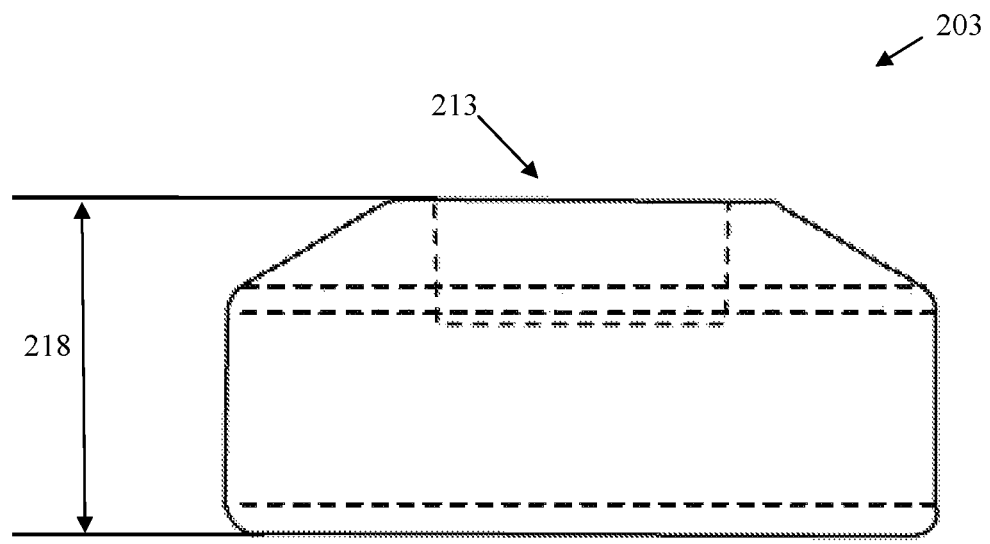

Cavity 213 extends into dispenser 203 to provide an opening for receiving at least one of a stem and coupler 211 as shown in FIG. 3B. Cavity 213 can be sized and dimensioned to provide a friction fit with at least one of the stem and the coupler. In other embodiments, cavity 213 can comprise threads that can fasten onto a threaded portion of at least one of the stem and coupler 211. As described above, it is also contemplated that dispenser 203 has a through hole to receive at least one of the stem and coupler 211. Although dispenser 203 has a circular shape when viewed from a top view, it is contemplated that any shape is suitable for dispenser 203, including, but not limited to, triangular shape, rectangular shape, pentagonal shape, square shape.

At least a portion of dispenser 203 is composed of an active agent. The portion of dispenser 203 can be any area on dispenser 203. More typically, dispenser 203 is composed of the active agent, such that the dispenser is at least one of an insecticide, a deodorant, uric acid-consuming bacteria, and an enzyme that digests grease and oil to thereby reduce problems associated with drains. In some embodiments, the active agent is an insecticide and at least a portion of dispenser 203 comprises the insecticide. In such embodiments, dispenser 203 can be a sacrificial bait that is used to kill insects. In other embodiments, the active agent is a deodorant and at least a portion of dispenser 203 comprises the deodorant. In such embodiment, dispenser 203 can be an aromatic material to reduce odor in the drain pipe. Furthermore, in other embodiments, the active agent is uric acid-consuming bacteria and at least a portion of dispenser 203 comprises uric acid-consuming bacteria.

Figure 4A:
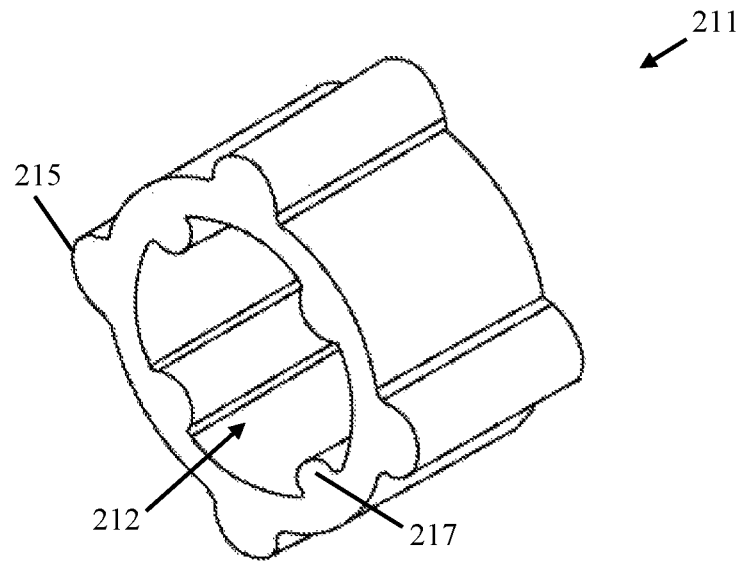
FIGS. 4A-4B are a top view and a side view of the coupler of FIGS. 2A-2B.
Figure 4B:
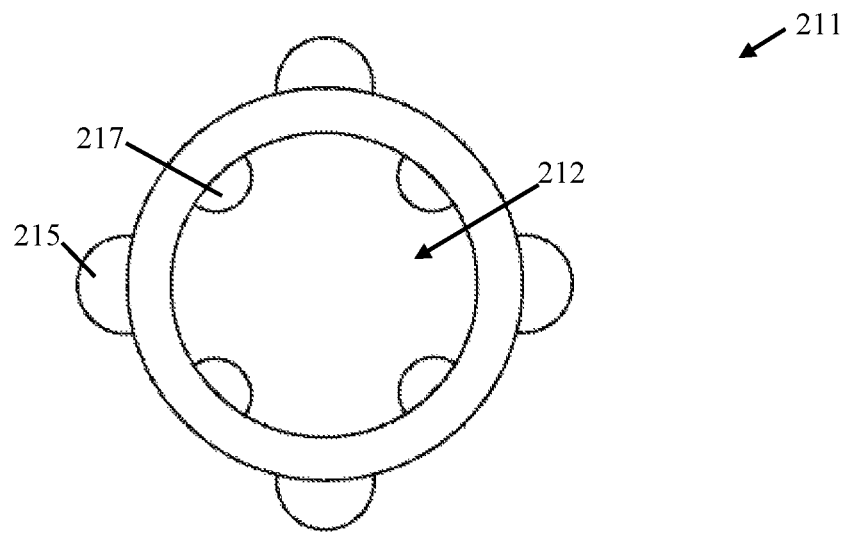

FIGS. 4A-4B show a coupler 211 having aperture 212. It is contemplated that coupler 211 can be manufactured using various suitable materials, including, but not limited to, a rubber material, PVC, and other materials suitable for a plumbing environment. Coupler 211 comprises outward ribs 215 and inward ribs 217. Inward ribs 217 provide a friction fit between inward ribs 217 and bottom portion 207 of the stem to thereby couple coupler 211 and the stem. However, it is contemplated that coupler 211 can comprise threads along aperture 212 to engage a threaded portion of the stem.

Outward ribs 215 provide a friction fit between outward ribs 215 and cavity 213 of dispenser 203 to thereby couple dispenser 203 and coupler 211. Although four outward ribs 215 are shown, it is contemplated that any number of outward ribs 215 can be used to provide a friction fit. Moreover, it is contemplated that coupler 211 can have threads disposed on its outer surface to engage threads on cavity 213 of dispenser 203.

Figure 5A:
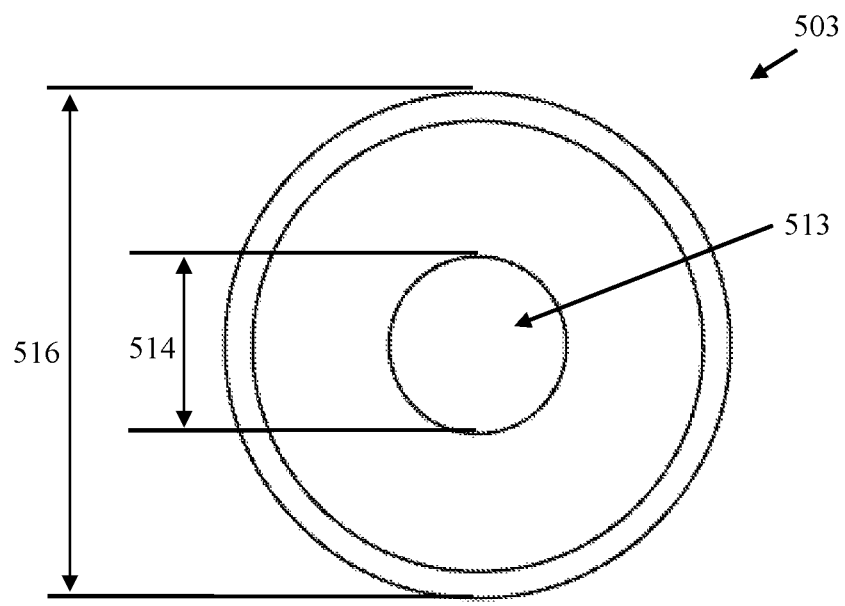
FIGS. 5A-5B are a top view and a side view of another embodiment of a dispenser.
Figure 5B:
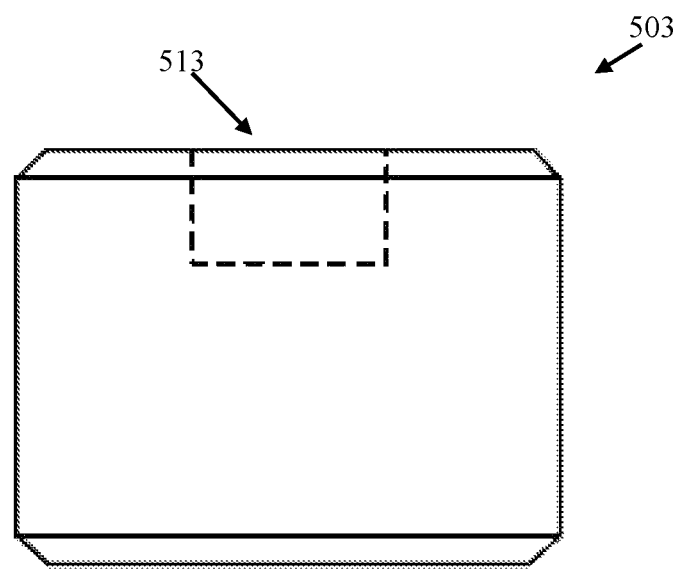

FIG. 5A shows another embodiment of a dispenser 503 having a cavity 513. Cavity 513 has a cavity diameter 514 having a length at least 25% of a dispenser diameter 516 of dispenser 503. Most typically, cavity diameter 514 has a length that is between 30-60% of dispenser diameter 516. As shown in FIG. 5B, cavity 513 extends into dispenser to receive at least one the stem and the coupler. Unlike the bevel edges of dispenser 203, dispenser 503 has chamfered edges.

In another aspect, a method of treating a drain having a stem that extends to a drain pipe with a treatment device is contemplated. The method comprises placing a dispenser that is at least partially composed of an active agent onto the stem. The active agent is configured to be dispensed by the dispenser and comprises at least one of an insecticide, a deodorant, uric acid-consuming bacteria, and an enzyme that digests grease and oil. Thus, problems associated with drains are reduced.

There are many contemplated methods of placing the dispenser onto the stem. For example, placing the dispenser onto the stem further comprises fastening a threaded aperture of the dispenser onto a threaded portion of the stem. In another example, placing the dispenser onto the stem further comprises placing a coupler onto the stem and subsequently placing the dispenser onto the coupler to thereby couple the dispenser onto the stem, wherein the coupler comprises an aperture configured to receive the stem. In yet another example, placing the dispenser onto the stem further comprises sliding the dispenser onto the stem using an aperture on the dispenser that is configured to receive the stem.

It should be appreciated that accidental exposure of the active agent to users that are nearby the drain is significantly reduced by locating the dispenser below the grate of the drain as shown above. Thus, the treatment device provides a safe method of treating insects and uric acid buildup in drain pipes by placing the active agent below the grate of the drain and away from nearby users.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A treatment device for a drain, the treatment device comprising:
    a skirt valve comprising a stem about which is disposed a skirt, the skirt angled downwardly from the stem to a rim of the skirt;
    a dispenser positioned in a region (a) below a coupling of the stem to the skirt, and above the rim, such that the skirt protects the dispenser from liquid flowing around the skirt and into the drain;
    an active agent configured to be dispensed by the dispenser; and
    wherein at least a portion of the dispenser is composed of the active agent.

2. The treatment device of claim 1, wherein the dispenser is a liquid soluble material.

3. The treatment device of claim 2, wherein the active agent comprises at least one of an insecticide, a deodorant, uric acid-consuming bacteria, and an enzyme that digests grease and oil.

4. The treatment device of claim 1, wherein the active agent comprises at least one of an insecticide, a deodorant, uric acid-consuming bacteria, and an enzyme that digests grease and oil.

5. The treatment device of claim 4, wherein the dispenser comprises the active agent in an amount effective to reduce at least one of odor, insects, uric acid, grease and oil.

6. The treatment device of claim 1, wherein the dispenser comprises an aperture that is sized and dimensioned to receive the stem to couple the dispenser to the stem.

7. The treatment device of claim 6, wherein the aperture comprises threads configured to engage with a threaded portion of the stem.

8. The treatment device of claim 1, wherein the dispenser is configured to directly couple to the stem.

9. The treatment device of claim 1, further comprising a coupler having an aperture, wherein the aperture is configured to receive the stem to couple the coupler to the stem.

10. The treatment device of claim 9, wherein the dispenser comprises a cavity that is sized and dimensioned to receive the coupler to couple the dispenser to the coupler.

11. The treatment device of claim 9, wherein the coupler comprises at least one rib that extends inward to provide a friction fit between the coupler and the stem, and at least one rib that extends outward to provide a friction fit between the coupler and the dispenser.

12. A treatment device for a drain, the treatment device comprising:
    a skirt valve comprising a stem about which is disposed a skirt, the skirt angled downwardly from the stem to a rim of the skirt;
    a dispenser positioned in a region (a) below a coupling of the stem to the skirt, and above the rim, such that the skirt protects the dispenser from liquid flowing around the skirt and into the drain;
    an active agent configured to be dispensed by the dispenser; and
    wherein the dispenser is configured to dissolve to dispense the active agent.

13. The treatment device of claim 12, wherein the active agent comprises at least one of an insecticide, a deodorant, uric acid-consuming bacteria, and an enzyme that digests grease and oil.

14. The treatment device of claim 12, wherein the dispenser comprises an aperture sized and dimensioned to receive a portion of the stem.

15. The treatment device of claim 12, wherein the dispenser comprises a composition that includes the active agent.

16. The treatment device of claim 12, further comprising a coupler having an aperture, wherein the aperture is configured to receive the stem to thereby couple the coupler to the stem, and wherein the dispenser comprises a cavity that is sized and dimensioned to receive the coupler to thereby couple the dispenser to the coupler.

17. A method of treating a drain with an active agent, comprising:

providing a drain valve having a stem about which is disposed a skirt, the skirt angled downwardly from a top of the skirt to a bottom of the skirt;

positioning a dispenser below the top portion of the skirt, and above the bottom portion of the skirt, such that the skirt protects the dispenser from liquid flowing around the skirt and into the drain;

wherein the active agent is configured to be dispensed by the dispenser; and wherein the active agent comprises at least one of an insecticide, a deodorant, uric acid-consuming bacteria, and an enzyme that digests grease and oil.

18. The method of claim 17, further comprising using a threaded coupling to couple the dispenser to the stem.

19. The method of claim 17, wherein the active agent comprises at least one of an insecticide, a deodorant, uric acid-consuming bacteria, and an enzyme that digests grease and oil.

20. The method of claim 17, wherein the step of positioning the dispenser further comprises sliding the dispenser onto the stem.

\* \* \* \* \*